United States Patent

[11] 3,589,018

| [72] | Inventors | Richard T. Thompson<br>Chicago;<br>David L. Simpson, Elmwood Park, both of, Ill. |
|---|---|---|
| [21] | Appl. No. | 855,842 |
| [22] | Filed | Sept. 8, 1969 |
| [45] | Patented | June 29, 1971 |
| [73] | Assignee | Illinois Tool Works Inc.<br>Chicago, Ill. |

[54] SUPPORT SYSTEM FOR INTERNAL GEAR-CHECKING APPARATUS
5 Claims, 3 Drawing Figs.

[52] U.S. Cl.................................................. 33/179.5 B,
    33/179.5 D
[51] Int. Cl..................................................... G01b 5/20
[50] Field of Search.......................................... 33/179.5 B

[56] References Cited
UNITED STATES PATENTS
3,314,157  4/1967  Motz et al.................... 33/179.5 B

*Primary Examiner*—Leonard Forman
*Assistant Examiner*—Paul G. Foldes
*Attorneys*—Robert W. Beart, Michael Kovac, Barry L. Clark and Jack R. Halvorsen ABSTRACT: Support device for holding and rotating an internal gear while its teeth are being checked, utilizes a pair of master gears and a pair of smooth-surfaced members such as rollers to engage the internal surface of the gear and to rotate it as it is being checked. One of the master gears and one of the rollers are mounted for movement toward the remaining gear and roller to facilitate loading of a gear to be checked.

PATENTED JUN 29 1971

3,589,018

INVENTOR
Richard T. Thompson
David L. Simpson
BY Barry L. Clark
Robert W. Heart
Their Att'ys

SUPPORT SYSTEM FOR INTERNAL GEAR-CHECKING APPARATUS

BACKGROUND OF THE INVENTION

1. Field of the Invention

This invention relates to gear-checking devices and particularly to a support arrangement for holding and rotating an internal gear as it is being checked.

2. Description of the Prior Art

Support systems for holding internal toothed gears while they are being checked commonly use three master gears, one of which is free to reciprocate during the checking operation in response to errors in the gear being checked. The motion of the reciprocating master gear is sensed by a sensing device. The sensing device can be a simple mechanical device such as a dial indicator or can be an electronic sensing device which includes an electronic pickup device which translates movement into voltages which are fed to various amplifiers or other electrical circuit devices which may be utilized to indicate the results of the gear-checking operation. An example of a gear inspection machine utilizing an electronic pickup is U.S. Pat. No. 2,965,971 issued to Henry Pomernacki and assigned to the assignee of the present invention. Although the Pomernacki U.S. Pat. No. 2,965,971 pertains to the inspection of external toothed gears, the gear-checking principals would be applicable for internal type gears. Specific examples of patented prior art devices for supporting internal gears during checking include U.S. Pat. Nos. 3,280,467 and 3,314,157 issued to C. H. Motz et al.

Although support devices such as are shown in the Motz patents and FIG. 2 of the present invention, are satisfactory for most purposes, they nevertheless, require the use of three extremely expensive master gears for each internal gear size to be checked. Furthermore, there is a limit to the smallest diameter of internal gear which can be checked on such a device or the ease with which it can be loaded due to the fact that the three master gears must be moved completely out of mesh with the internal gear during a loading operation.

SUMMARY

It is an object of this invention to provide a support apparatus for an internal gear-checking machine which is relatively simple and economical to manufacture and in addition, supports the gear to be tested with only two master gears.

It is another object of this invention to provide a support apparatus wherein the parts which engage a gear to be checked are automatically moved toward each other and away from the gear to be checked during a loading operation to facilitate easy loading of the apparatus.

These objects are obtained by the support apparatus of the present invention wherein a pair of master gears and a pair of smooth-surfaced members, preferably rollers, are mounted diametrically opposite to each other interiorly of the gear to be checked. One of the master gears and one of the rollers are mounted for movement toward the remaining gear and roller during loading operations by means of a reciprocating slide member in the case of the master gear and a pivoted support member in the case of the movable roller. An air cylinder is utilized during a loading operation to move and hold the movable master gear and movable roller against the spring-biasing forces which hold these members in contact with the gear being checked as is rotated during a checking operation.

The foregoing and other objects, features, and advantages will be apparent from the following more particular descriptions of preferred embodiments thereof, as illustrated in the accompanying drawings.

DESCRIPTION OF THE INVENTION

Figure 1:
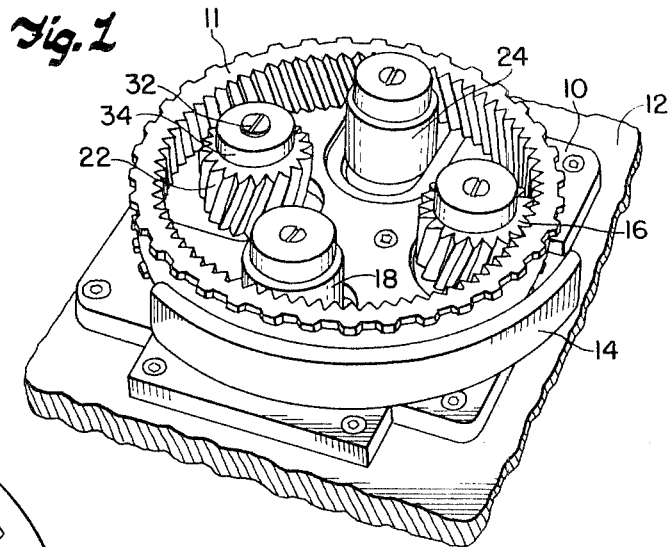
FIG. 1 is a perspective view showing the improved support apparatus in loading position relative to an internal gear to be checked.

In FIG. 1 can be seen a support plate 10 for supporting the end face of a work gear 11 to be checked. The support plate is removably affixed to the base of frame 12 of the gear-checking apparatus. A curved flange member 14 may be mounted to the frame 12 as an aid to an operator in guiding a gear 11 to be checked as it is placed on the index plate 10 in a position close to master gear 16 and guide roller 18 which are mounted for rotation about fixed axes passing through support plate 10. Master gear 22 is mounted diametrically opposite master gear 16 and is movable toward it to facilitate loading of a work gear 11. Similarly, a second guide roller 24 is mounted diametrically opposite the first roller 18 and is capable of pivotal movement during a loading operation toward both master gear 16 and fixed roller 18. The master gears and rollers 16, 22, and 18, 24 respectively, are mounted on shafts and held with retainers such as the shaft 32 and retainer 34 associated with master gear 22.

Figure 2:
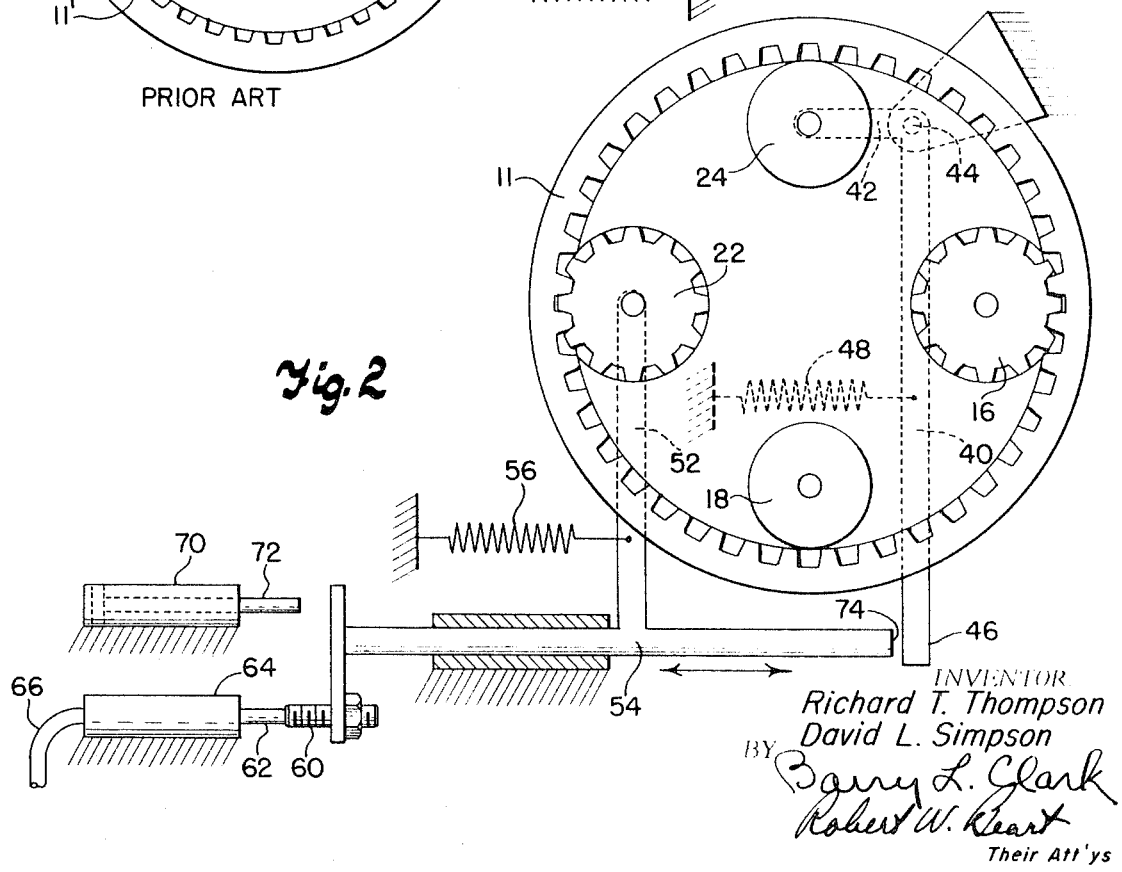
FIG. 2 is a schematic representation of the supporting apparatus in operative engagement with an internal gear to be checked and showing the linkages which retract one of the gears and rollers during a loading operation.

In FIG. 2 the gear-supporting device of the invention is illustrated schematically in top plan view in order to indicate the movements of the movable master gear 22 and guide roller 24 during a loading operation. The guide roller 24 is mounted on a right-angled link member 40 at one end 42 thereof. The link member 40 is pivoted at 44 to the frame of the machine and moved about the pivot 44 in the direction of the arrow by pressure applied at the opposite end 46 thereof. The link member 40 is normally biased to the position shown in FIG. 2 by a spring 48 attached to the frame so as to hold the guide roller 24 in engagement with the internal teeth of the work gear 11. The master gear 22 is mounted on a portion 52 of a slide member 54 slidable in the direction of the arrow in the frame of the checking machine. The slide 54 is normally biased into engagement with the work gear 11 by a spring 56 affixed to the machine frame. An adjustable finger 60 affixed to the end of the slide 54 is adapted to engage the probe 62 of an electronic pickup device 64 as the work gear 11 is rotated during the checking operation by master gear 22. Master gear 22 is preferably rotated by a motor and pulley (not shown) but could also be rotated by hand if desired. The varying voltage signals produced by movement of the probe 62 in response to movements of the finger member 60 due to errors in the work gear teeth as they roll in mesh with the master gear 22 are transmitted to an amplifier device (not shown) through wires 66.

When a checking operation is completed and it is desired to release the master gear 22 and the roller 24 from engagement with the work gear 11, a powered device such as an air cylinder 70 is actuated to cause its piston 72 to move slide 54 to the right. This movement of the slide 54 against the biasing effect of spring 56 will move master gear 22 toward master gear 16. The movement of slide 54 will also cause pivotal movement of guide roller 24 about pivot point 44 since extension arm 74 on slide 54 will contact the end 46 of link member 40. When the master gear 22 and guide roller 24 are in their retracted position, work gears 11 can easily be loaded or unloaded.

Figure 3:
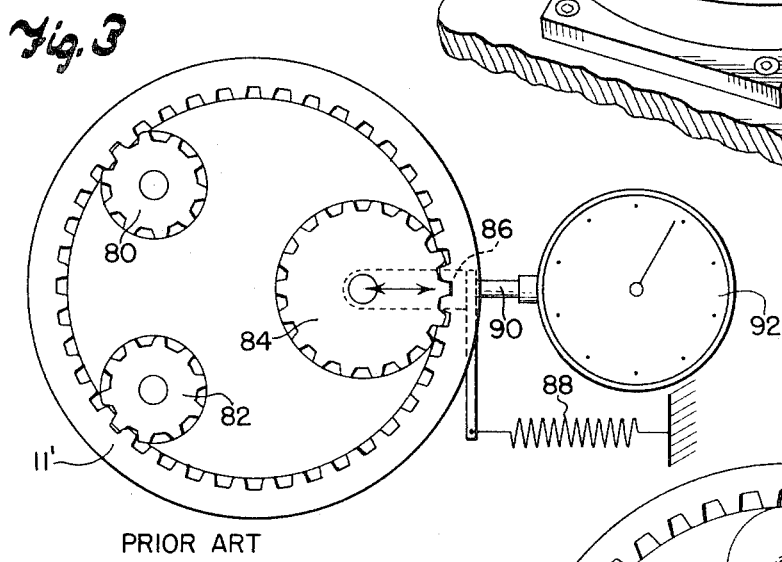
FIG. 3 is a top plan view of a prior art gear-supporting apparatus.

FIG. 3 illustrates a prior art gear-supporting arrangement of the type requiring three master gears. Master gears 80 and 82 are fixed while master gear 84 is movable in the direction indicated by the double arrow due to its being mounted on a reciprocating slide member 86. The master gear 84 is biased into engagement with a work gear 11' by means of biasing spring 88 attached to the frame and slide 86. The probe 90 of a dial indicator 92 transmits the movements of the slide 86 during a checking operation to the dial face of the dial indicator.

From the preceding description it will be readily appreciated that the improved support apparatus not only supports a work gear being checked at equally spaced points about its periphery, but permits the elimination of one of the three extremely expensive master gears previously required for checking each different size of work gear. Although the device does require two guide rollers, not required by the prior art, these rollers are very inexpensive compared to the master gears. Furthermore, since the guide rollers do not mesh with the work gear being checked they need be moved only slightly to be brought out of engagement with the work gear in order to permit loading and unloading to take place.

We claim:

1. Apparatus for supporting internal gears in a gear-checking apparatus comprising a support plate for supporting an end face of an internal toothed work gear to be checked, a pair of rotatably mounted master gears adapted to mesh with the internal teeth of the work gear, a pair of smooth-surfaced guide members positioned between said master gears and adapted to engage the tips of the internal teeth of the work gear, means for holding at least one of said master gears and at least one of said guide members in resiliently biased engagement with the work gear during a checking operation, means for mounting said at least one master gear and said at least one guide member for movement out of contact with the internal teeth of the gear being checked, and means for moving said last-named means against said means for holding to permit the work gear to be unloaded from the apparatus.

2. The apparatus of claim 1 wherein one of said master gears is fixed and said at least one master gear is mounted for reciprocating movement toward and away from it.

3. The apparatus of claim 2 wherein said guide members are rollers, one of which is fixed and the other of which is mounted for pivotal movement toward the fixed roller and the fixed master gear.

4. The apparatus of claim 3 wherein the movable master gear is mounted on a slide, spring means for biasing said slide and the master gear mounted thereon into engagement with a work gear, and powered piston means, operative when actuated, for moving said slide against said spring means.

5. The apparatus of claim 4 wherein said slide includes an extension portion for engaging a pivoted link member on which the pivotally movable roller is mounted when said powered piston means is actuated.